(12) United States Patent
Ma et al.

(10) Patent No.: US 10,445,660 B2
(45) Date of Patent: Oct. 15, 2019

(54) LEARNING APPARATUS IN DIGITAL ENVIRONMENT

(71) Applicants:Zhengfang Ma, Shanghai (CN); Hong Tan, Shanghai (CN)

(72) Inventors: Zhengfang Ma, Shanghai (CN); Hong Tan, Shanghai (CN)

( * ) Notice: Subject to any disclaimer, the term of this patent is extended or adjusted under 35 U.S.C. 154(b) by 0 days.

(21) Appl. No.: 15/545,319

(22) PCT Filed: Feb. 5, 2016

(86) PCT No.: PCT/CN2016/073598
§ 371 (c)(1),
(2) Date: Jul. 21, 2017

(87) PCT Pub. No.: WO2016/127922
PCT Pub. Date: Aug. 18, 2016

(65) Prior Publication Data
US 2018/0005138 A1    Jan. 4, 2018

(30) Foreign Application Priority Data

Feb. 12, 2015   (CN) .......................... 2015 1 0075286

(51) Int. Cl.
*G06F 15/18*    (2006.01)
*G06N 20/00*    (2019.01)
(Continued)

(52) U.S. Cl.
CPC ........... *G06N 20/00* (2019.01); *G06F 16/285* (2019.01); *G06F 16/9535* (2019.01);
(Continued)

(58) Field of Classification Search
CPC ........ G06F 17/30598; G06F 17/30867; G06N 99/005; G06Q 50/10
See application file for complete search history.

(56) References Cited

U.S. PATENT DOCUMENTS

| | | | |
|---|---|---|---|
| 2004/0024739 A1* | 2/2004 | Copperman | .......... G06F 16/367 707/E17.074 |
| 2013/0085955 A1 | 4/2013 | Dugas | |

(Continued)

FOREIGN PATENT DOCUMENTS

| | | |
|---|---|---|
| CN | 102207946 A | 10/2011 |
| CN | 103605706 A | 2/2014 |

(Continued)

*Primary Examiner* — Luis A Sitiriche
(74) *Attorney, Agent, or Firm* — Wayne & Ken, LLC; Tony Hom

(57) ABSTRACT

A learning apparatus in a digital environment is advantageous to interaction and communication among users who use a knowledge point structure for learning. The learning apparatus in the digital environment constructs a structurized knowledge library by editing knowledge points, tags of the knowledge points and a relationship among the knowledge points; then records a user's mastery degree for the knowledge points on the basis of the tags; and records knowledge learning information and social attribute information thereof for each user, so as to construct a general-class learning record, a single-class learning record and a general knowledge learning system of the user, which can also be used for the user to view the popularity of each tag in the knowledge library.

10 Claims, 9 Drawing Sheets

(51) Int. Cl.
*G06F 16/28* (2019.01)
*G06Q 50/10* (2012.01)
*G06F 16/9535* (2019.01)
*G06Q 50/20* (2012.01)
*G06N 5/02* (2006.01)

(52) U.S. Cl.
CPC ............. *G06N 5/022* (2013.01); *G06Q 50/10* (2013.01); *G06Q 50/20* (2013.01)

(56) References Cited

U.S. PATENT DOCUMENTS

| | | | |
|---|---|---|---|
| 2014/0201276 A1* | 7/2014 | Lymberopoulos | H04W 4/21 709/204 |
| 2014/0220540 A1* | 8/2014 | Burgin | G09B 7/07 434/362 |

FOREIGN PATENT DOCUMENTS

| CN | 104866557 A | 8/2015 |
|---|---|---|
| CN | 104951560 A | 9/2015 |

* cited by examiner

LEARNING APPARATUS IN DIGITAL ENVIRONMENT

CROSS REFERENCE TO RELATED PATENT APPLICATION

The present application is the US national stage of PCT/CN2016/073598 filed on Feb. 5, 2016, which claims the priority of the Chinese patent application No. 201510075286.4 filed on Feb. 12, 2015, which application is incorporated herein by reference.

FIELD OF INVENTION

The present invention relates to a system for mapping and sharing a knowledge point, especially to a system for mapping and sharing a knowledge point in a human knowledge structure.

DESCRIPTION OF RELATED ARTS

Human knowledge is vast and endless, including big classes like science, literature, philosophy, art and so on; and there are many small classes subordinated to the big classes, for example, the science is divided into mathematics, physics, chemistry, etc., and the art is divided into drawing, music, calligraphy, etc. Furthermore, the small classes can be further subdivided again. It can be seen therefrom that the entire human knowledge structure is like a huge net, and the minimum unit constituting the knowledge network can be referred to as a knowledge point.

At present, there exist products for sorting a knowledge network and providing same for a user to use, among which famous are such as Baidu Encyclopedia. Baidu Encyclopedia is like a content-open free network encyclopedia platform, and has some interactivity with users using the platform. The user can create, view and edit each knowledge point on the platform. Moreover, knowledge points which are mutually correlated are associated by Baidu Encyclopedia. The most basic unit of Baidu Encyclopedia is referred to as an entry, and the objects created, edited, searched and viewed by a user are entries.

However, the interaction provided by a product like Baidu Encyclopedia is essentially the interaction between users and the platform, but there is hardly no interaction between various users, and a user's learning condition or experience of his/her own for a knowledge point cannot be shared. So, in terms of interactivity, a product like Baidu Encyclopedia is incapable of well providing associations between users, and the sharing and communication between learners over the same knowledge point.

Additionally, everyone has his/her own knowledge structure system. Knowledge points in the head of a learner can form a network-shaped structure; however, learners' knowledge structure systems, learning experiences and the like often cannot be interacted and shared, making knowledge learning become a lonely practice of individuals.

SUMMARY OF THE PRESENT INVENTION

A brief summary on one or more aspects is given below to provide a basic understanding for these aspects. The summary is not a detailed review for all the conceived aspects, and is neither intended to point out all the critical or decisive factors for all the aspects nor attempting to define the scope of any or all of the aspects. Its only object is to provide in a simplified manner some concepts of one or more aspects as the preface of the more detailed description given later.

An object of the present invention is to solve the above-mentioned problem, and provide a learning apparatus in a digital environment, which is advantageous to the interaction and communication between users who use knowledge point structures for learning.

The technical solution of the present invention is as follows: the present invention reveals a learning apparatus in a digital environment. The system comprises a cloud server platform and a terminal device, wherein the cloud server platform further comprises a knowledge point structurized storage apparatus and a user information storage apparatus;

the knowledge point structurized storage apparatus comprises a knowledge point library module, a tag library module, a relationship library module and a structurized knowledge library module, wherein:
- the knowledge point library module stores various knowledge points;
- the tag library module stores tags of the various knowledge points, with the tags and the knowledge points being in one-to-one correspondence;
- the relationship library module stores a relationship among the various knowledge points; and
- the structurized knowledge library module constructs a knowledge point structure based on the relationship among the various knowledge points and stores all the knowledge points with the structure; and the user information storage apparatus stores user information about various users, wherein each piece of user information at least contains a user attribute, tag classification information about the knowledge points corresponding to the user, relationship information about the knowledge points corresponding to the user, structurized knowledge corresponding to the user and social attribute information about the user, wherein the tag classification information about the knowledge points corresponding to the user is a classification of tags based on the user's mastery degree for the knowledge points, the relationship information about the knowledge points corresponding to the user is a relationship among the knowledge points learnt by the user, the structurized knowledge corresponding to the user refers to a knowledge point structure constructed on the basis of the relationships among various knowledge points learnt by the user, and the social attribute information about the user refers to the user's attitude to sharing the learnt knowledge points.

According to an embodiment of the learning apparatus in the digital environment of the present invention, the relationship among the various knowledge points stored in the relationship library module comprise an ordinary logical relationship, a philosophical relationship and a mathematical relationship among the knowledge points.

According to an embodiment of the learning apparatus in the digital environment of the present invention, the knowledge point structurized storage apparatus further comprises a fractal library module, wherein the fractal library module expresses a relationship among stored tags based on the fractal theory.

According to an embodiment of the learning apparatus in the digital environment of the present invention, the classification for tags by a tag classification information module includes viewed, authenticated and mastered.

According to an embodiment of the learning apparatus in the digital environment of the present invention, the social attribute information about the user includes whether an identity of the user himself/herself is open or whether the user shares learnt knowledge points.

According to an embodiment of the learning apparatus in the digital environment of the present invention, the system performs a knowledge point access operation on the knowledge point library module, wherein an access operation mode comprises text, picture, audio, video, multi-media, and multi-language accesses.

According to an embodiment of the learning apparatus in the digital environment of the present invention, each piece of user information further comprises user note information for recording the user's note information about the tags, the relationship and the structurized knowledge.

According to an embodiment of the learning apparatus in the digital environment of the present invention, the cloud server platform further comprises:

a general-class user learning recording apparatus for recording a learning process of all knowledge points by the user based on a time axis.

According to an embodiment of the learning apparatus in the digital environment of the present invention, the cloud server platform further comprises:

a single-class user learning recording apparatus for recording a learning process of a single-class knowledge points by the user based on a time axis.

According to an embodiment of the learning apparatus in the digital environment of the present invention, the single-class user learning recording apparatus further records the user's notes for the tags of and the relationship among the learnt knowledge points, and the structurized knowledge.

According to an embodiment of the learning apparatus in the digital environment of the present invention, the cloud server platform further comprises:

a user knowledge structure recording apparatus for recording a knowledge structure of the knowledge points learnt by the user based on the learning record of the user for the knowledge points.

According to an embodiment of the learning apparatus in the digital environment of the present invention, the cloud server platform further comprises:

a knowledge point popularity display apparatus for displaying the popularity of a tag corresponding to a knowledge point based on the condition of each knowledge point being accessed by users.

According to an embodiment of the learning apparatus in the digital environment of the present invention, the cloud server platform further comprises: an administrator and an administration information storage apparatus.

The present invention has the following beneficial effects compared with the prior art: the present invention constructs a structurized knowledge library by editing knowledge points, tags of the knowledge points and a relationship among the knowledge points, then records a user's mastery degree for the knowledge points on the basis of the tags, and further records knowledge learning information and social attribute information thereof for each user, so as to construct a general-class learning record, a single-class learning record and a general knowledge learning system of the user, which can also be used for the user to view the popularity of each tag (users' learning condition for each knowledge point) in the knowledge library. Compared with traditional knowledge learning platforms like Baidu Encyclopedia, the present invention records a user's mastery degree for a knowledge point, constructs and visualizes the user's entire learning experience on this basis. Meanwhile, the platform of the present invention provides the user with a function of sharing a knowledge point learning experience. The learning apparatus in a digital environment of the present invention records information about a user's lifelong learning path, facilitates knowledge sharing (especially unpopular knowledge), and helps learners provide tags and establish a social learning environment. Additionally, the present invention also helps the user to track back to the learning record and learning notes of himself/herself after finishing learning related knowledge points, and also helps the user recognize the classification of knowledge by recognizing fractal theory-based knowledge classification.

DETAILED DESCRIPTION OF THE PREFERRED EMBODIMENTS

Figure 1:
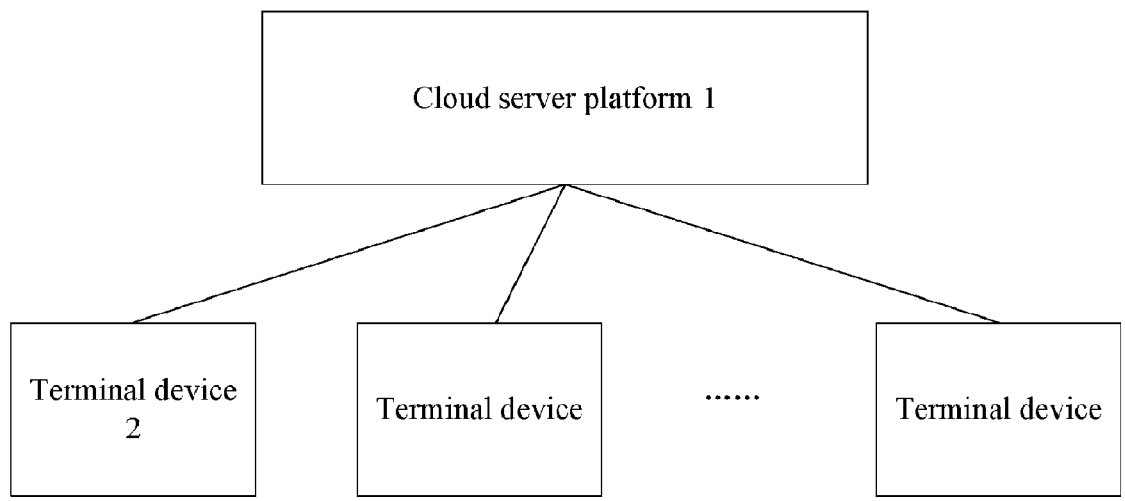
FIG. 1 shows an overall structural diagram of a preferred embodiment of a learning apparatus in a digital environment of the present invention.

After reading the detailed description of the embodiments of the present disclosure in conjunction with the following drawings, the above-mentioned features and advantages of the present invention can be better understood. In the drawings, various components are not necessarily drawn to scale, and components with similar related characteristics or features may have the same or similar reference numerals.

Figure 2:
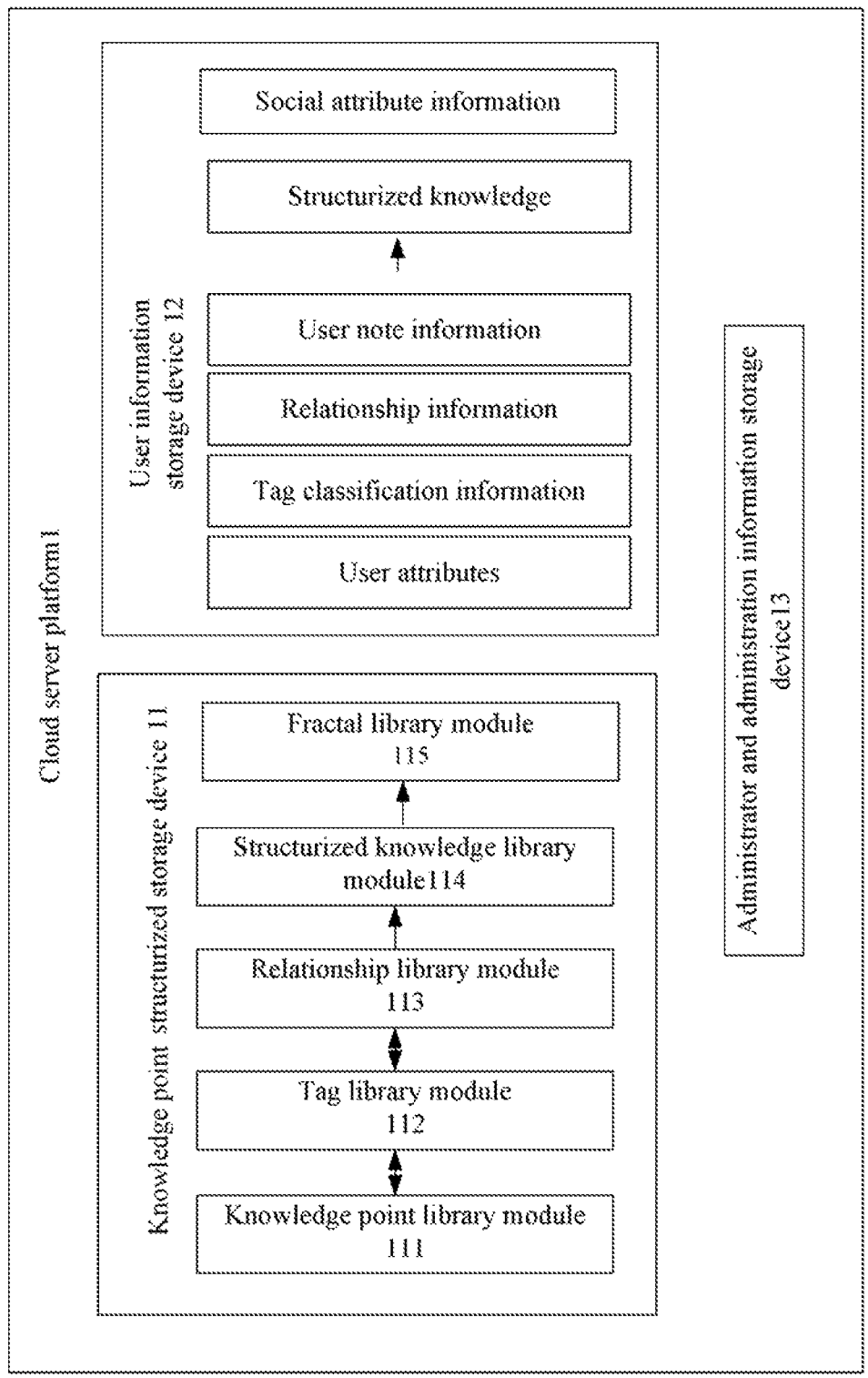
FIG. 2 shows an internal structural diagram of a cloud server platform in the learning apparatus in a digital environment of the present invention.

Please see FIG. 1, FIG. 1 shows an overall structure of a preferred embodiment of a learning apparatus in a digital environment of the present invention, wherein the learning apparatus in the digital environment is composed by a cloud server platform 1 and a plurality of terminal devices 2 together. The internal structure of the cloud server platform 1 is further subdivided as shown in FIG. 2. Please also see FIG. 2, the cloud server platform 1 comprises a knowledge point structurized storage apparatus 11 and a user information storage apparatus 12. The knowledge point structurized storage apparatus 11 comprises a knowledge point library module 111, a tag library module 112, a relationship library module 113 and a structurized knowledge library module 114. The terminal devices 2 only store tags, and the number of reads is not limited.

The knowledge point library module 111 stores various knowledge points. The so called knowledge points refer to the most basic units constructing an entire knowledge structure, which are similar to the entries in Baidu Encyclopedia, and are the most basic objects created, edited, searched, displayed and learnt by a user.

The tag library module 112 stores tags of the various knowledge points. The tags are the names of the knowledge points in essence, so the tags and the knowledge points have one-to-one mapping correspondences. Each knowledge point has one tag of its own, and each tag also corresponds to one knowledge point.

The relationship library module 113 stores a relationship among the various knowledge points. The knowledge points are not mutually independent without any association; in contrast, an association exists among the knowledge points, for example, an ordinary logical relationship (logical relationships such as parataxis, inclusion, inheritance, etc.), a philosophical relationship and a mathematical relationship exist among the knowledge points, as well as relationships in the sense of computers, so as to reveal the systematicness and dynamism of knowledge.

The structurized knowledge library module 114 constructs the structure of the entire knowledge point system with the knowledge points in the knowledge point library module 111 as objects and the relationships among the various knowledge points in the relationship library module 113 as a tool, and stores all the knowledge points with this structure and classifies the knowledge points. Preferably, the structurized knowledge library module 114 does not store all contents of the knowledge points, the particular contents of the knowledge points are still stored in the knowledge point library module 111, and the structurized knowledge library module 114 only stores the structurized tags (the tags can directly map the knowledge points stored in the knowledge point library module). Preferably, the knowledge point structurized storage apparatus 11 further comprises a fractal library module 115, wherein the fractal library module 115 expresses the relationship among the tags with the fractal theory. The fractal theory comprises regular fractal or irregular fractal, which graphicalizes knowledge structures using self-similarity of same typed knowledge structures, so that it is convenient for the user to recognize and classify knowledge.

Figure 3:
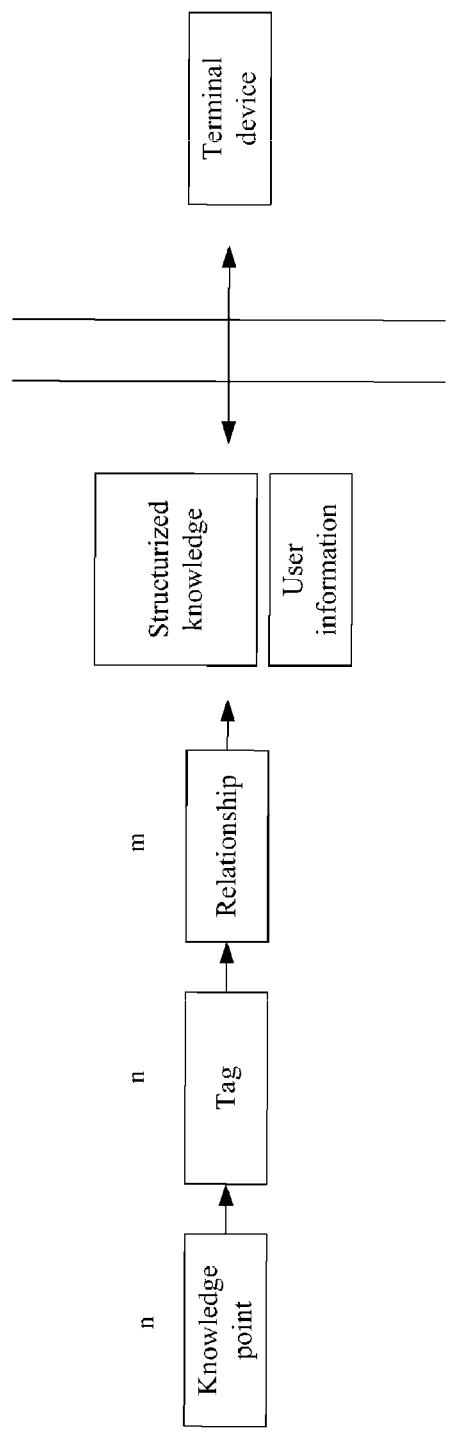
FIG. 3 shows a knowledge structural diagram in the present invention.
Figure 4:
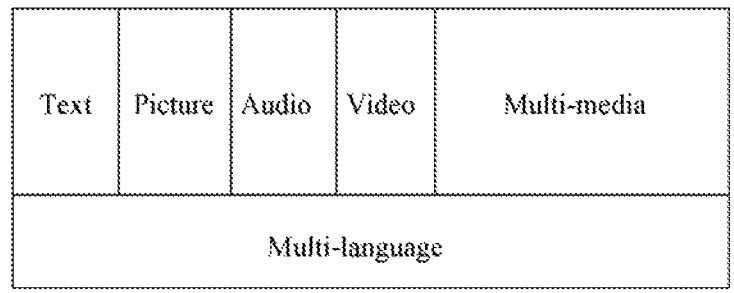
FIG. 4 shows a schematic diagram of a knowledge point access mode in the present invention.

Therefore, as shown in FIG. 3, the entire knowledge point structurized storage apparatus 11 successively stores n knowledge points, n tags mapped by the n knowledge points, m relationships among the n knowledge points (tags), and structurized knowledge composed by L classes of knowledge constructed by the n knowledge points (tags) and the m relationships. The terminal device performs interactive operations with the knowledge points, the tags, the relationships, the notes and the user information. Such interactive operations include a knowledge point access operation performed by the system on the knowledge point library module 111, wherein the access operation mode comprises text, picture, audio, video, multi-media accesses as shown in FIG. 4, and the operation can be multi-language access in terms of languages.

The user information storage apparatus 12 stores user information about various users, and a unit for recording user information is configured for each user. This user information about the user at least contains the contents as follows: user attributes, tag classification information about the knowledge points corresponding to the user, relationship information about the knowledge points corresponding to the user, the structurized knowledge corresponding to the user and social attribute information about the user.

User attributes generally refer to the attributes of the user himself/herself, such as a name, age, gender, education background, hobbies and interests of the user, etc. The tag classification information about the knowledge points corresponding to the user refers to the user's mastery degree of the knowledge points when learning the knowledge points, which can be divided into three degrees, i.e. viewed, authenticated and mastered, depending on the user's mastery degrees of the learnt knowledge points in the present invention. The division is of course not limited thereto. In this way, each tag has different classifications for different users, and the system labels the tags of the knowledge points that the user has learnt according to the user's mastery condition of the knowledge points, which can be labeled as three categories, i.e. viewed, authenticated or mastered.

The relationship information about the knowledge points corresponding to the user refers to the relationship among the knowledge points that the user has learnt. Herein, the so-called relationship is the same as the logical relationship, the philosophical relationship or the mathematical relationship referred to in the relationship library module 113; and the difference is that the relationship library module 113 stores the relationship among all the knowledge points, but the relationship herein is only the relationship among the knowledge points that the user has learnt, that is to say, the latter is a subset of the former. In this embodiment, the relationship among the knowledge points that the user has learnt can be further limited to the relationship among the knowledge points that have been authenticated by the user. A knowledge point structure constructed on the basis of the relationship among the knowledge points that have been authenticated by the user is the structurized knowledge corresponding to the user. The social attribute information about the user refers to the user's attitude to sharing the learnt knowledge points, for example, whether to open the identity of himself/herself, or whether to share the learnt knowledge points, etc.

Take the following of the same user as a basic unit: the user attribute, tag classification information about the knowledge points corresponding to the user, relationship information about the knowledge points corresponding to the user, the structurized knowledge corresponding to the user and social attribute information about the user; all these information is stored in the user information storage apparatus 12.

Additionally, the user information of each user further comprises user note information for recording note information about the tags, the relationship and structurized knowledge corresponding to the user, which particularly refer to the user's corresponding attainment for the tags and the relationship, supplemental information and note information that the user needs to annotate.

Figure 5:
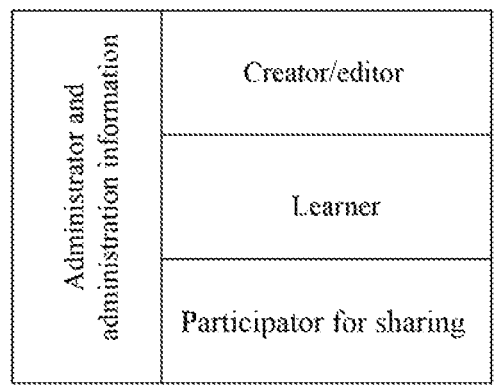
FIG. 5 shows a constituent diagram of visitors for the cloud server platform.

Preferably, the cloud server platform further comprises an administrator and an administration information storage apparatus 13. Visitors for the cloud server platform generally comprise the administrator and administration information, a creator/editor, a learner (visitor), and sharing participator as shown in FIG. 5.

Please see FIGS. 10A to 10D, in the system, sharing and recording knowledge points are mainly implemented via the following apparatuses: a general-class user learning recording apparatus 14, a single-class user learning recording apparatus 15, a user knowledge structure recording apparatus 16 and a knowledge point popularity display apparatus 17. These apparatuses can be implemented independently respectively, and can also be implemented to be integrated in the same cloud server platform.

Explanation is respectively made in terms of these apparatuses.

Figure 10A:
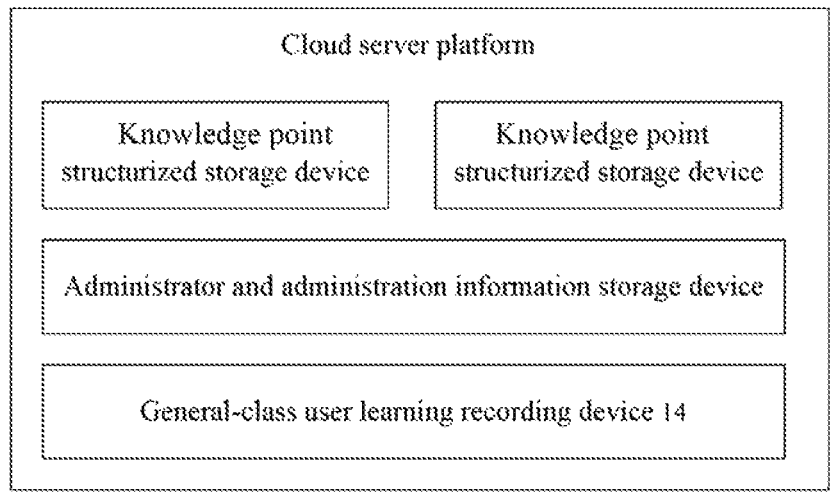
FIGS. 10A to 10D show schematic diagrams of other embodiments of the cloud server platform.

Please see FIG. 10A, in the general-class user learning recording apparatus 14, the learning process of a single user (which can also be referred to as a learner) learning all the learning points is recorded, and a learning track is formed. During the recording process, the record is made in time sequence, and the recorded objects are tags of the knowledge points learnt by the user each time, the mastery degree for the knowledge points (the classification of the tags, such as viewed, authenticated or mastered, etc.), and learning time.

Figure 6:
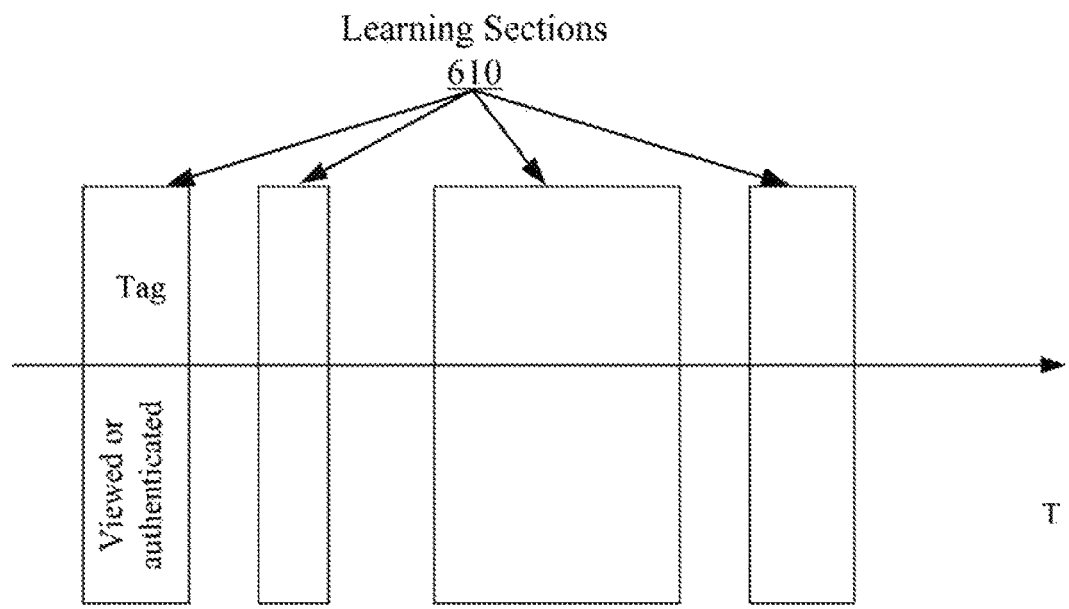
FIG. 6 shows a schematic diagram of a general-class learning record of a learner.

Such a learning record can be illustrated with a schematic diagram of a time axis, as exemplified in FIG. 6. It is shown from FIG. 6 that each frame represents a learning section of the user, wherein a width of the learning section represents learning time, and a tag learned by the user in this learning section is displayed at the upper part of the learning section, and the user's mastery degree for the learnt knowledge points is displayed at the lower part of the learning section.

Figure 10B:
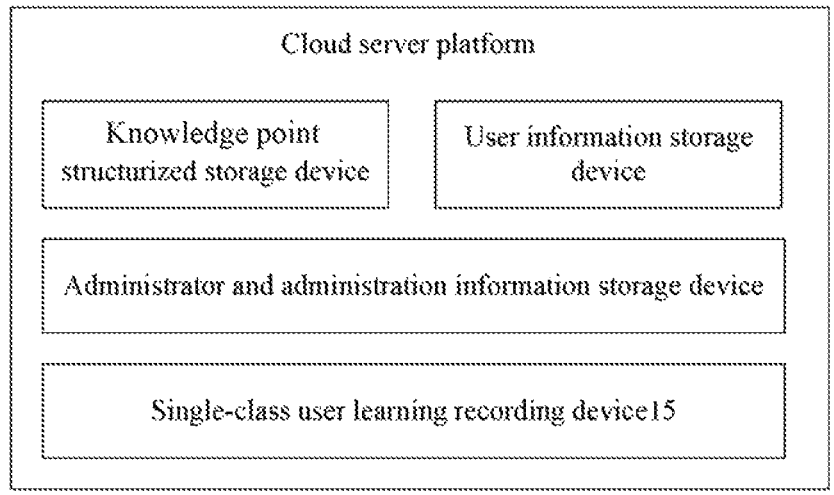

Please see FIG. 10B, in the single-class user learning recording apparatus 15, the learning process of a single user learning a single-class learning point is recorded, and a learning track is formed. During the recording process, the record is also made in time sequence, and the recorded objects are the user's the mastery degree for a certain individual class of knowledge points (the classification of the tags, such as viewed, authenticated or mastered, etc.), and learning time.

Figure 7:
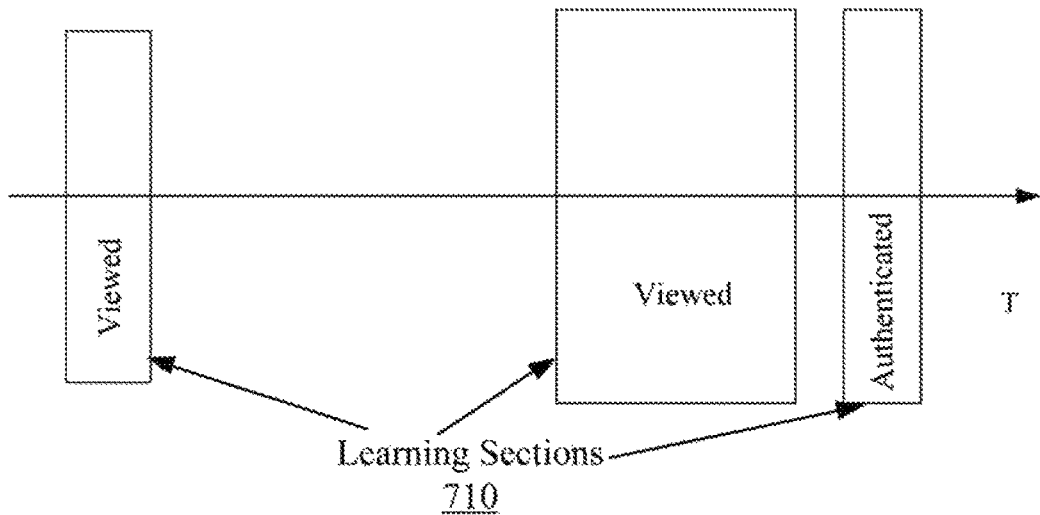
FIG. 7 shows a schematic diagram of a single-class learning record of a learner.

Such a learning record can be illustrated with a schematic diagram of a time axis, as exemplified in FIG. 6. It is shown from FIG. 7 that each frame represents a learning section of the user, wherein a width of the learning section represents learning time, and the characters displayed in the learning section represents the user's mastery degree for the learnt knowledge point.

Additionally, the single-class user learning recording apparatus 15 can further record the user's notes for the tags of and the relationship among the learnt knowledge points, and the structurized knowledge, and such information is stored in the user note information.

Figure 8:
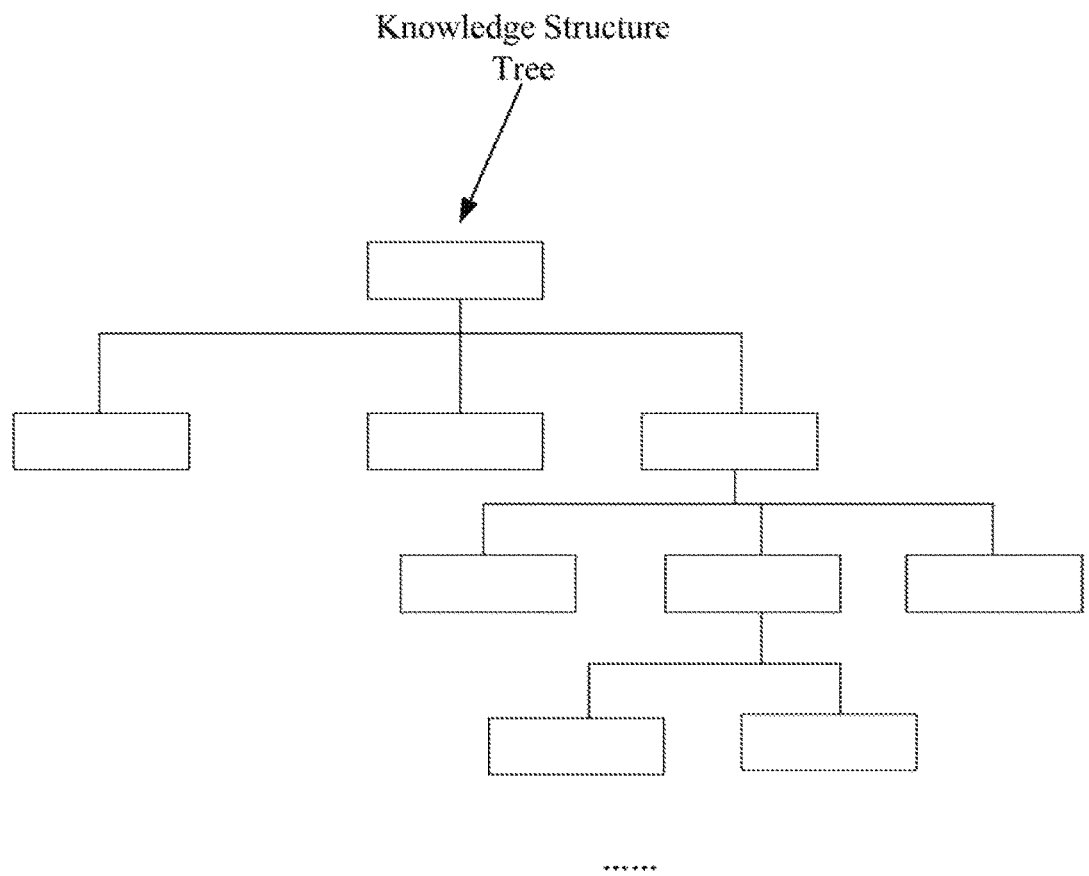
FIG. 8 shows an overall knowledge structural diagram of a learner by a time point.
Figure 10C:
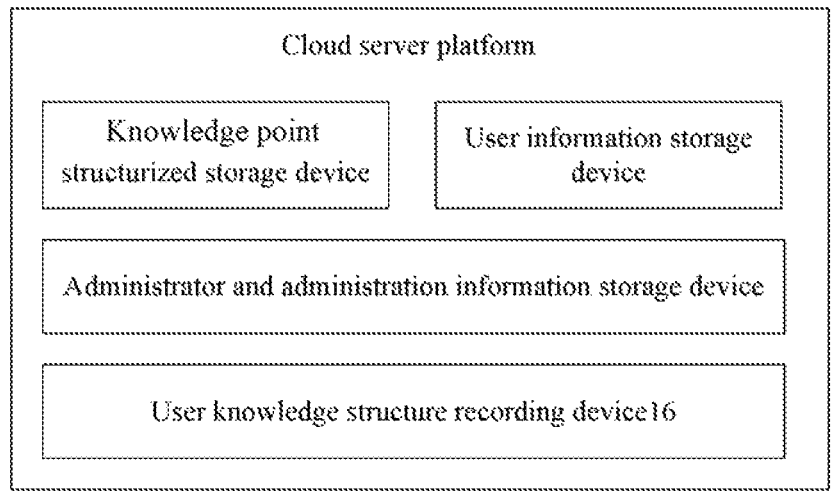

Please see FIG. 10C, the user knowledge structure recording apparatus 16 records an overall knowledge structure system of a user by a time point, which can be illustrated a tree diagram as shown in FIG. 8. This knowledge structure system is equivalent to a subset in the structurized knowledge composed by the L classes of knowledge stored in the cloud server platform, because only a part of the structure in the entire structurized knowledge that the user has learnt is recorded. Of course, the tree diagram in FIG. 8 is merely an example, and in practice, this knowledge structure system of the user can also be expressed with the fractal theory in a graphicalized manner.

Figure 9A:
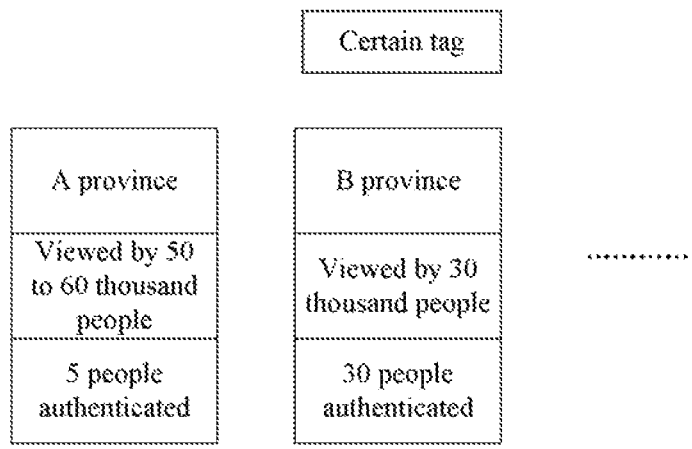
FIGS. 9A to 9C show graphs of the popularity of knowledge points.
Figure 9B:
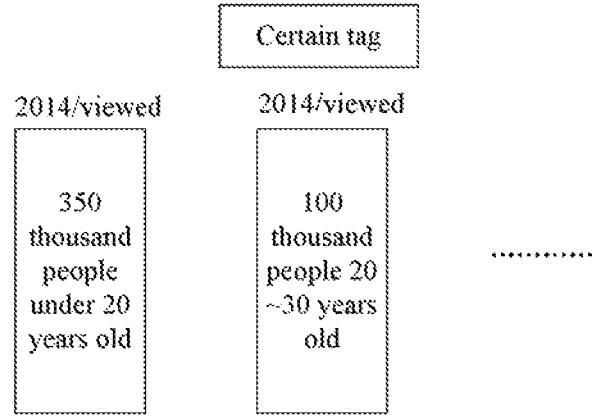
Figure 9C:
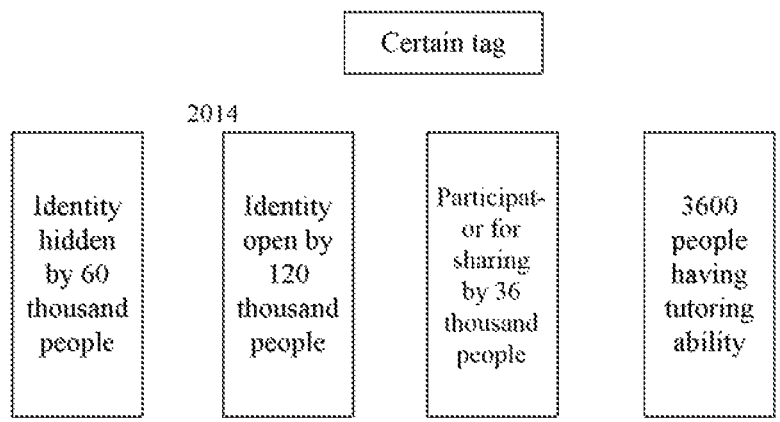
Figure 10D:
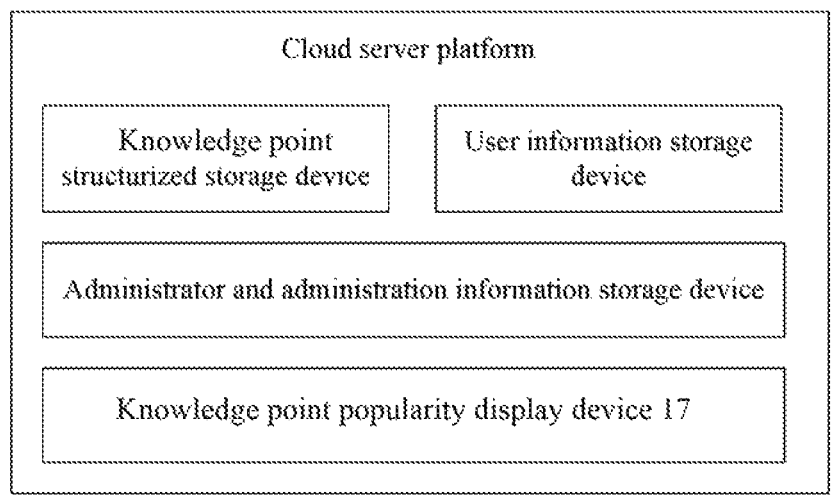

The above-mentioned is the schematic content of the learnt knowledge points recorded and displayed from a viewpoint of a user. The system may also record the popularity of a knowledge point corresponding to a tag from a viewpoint of the tag, as shown in FIG. 10D. As shown in FIGS. 9A to 9C, the knowledge point popularity display apparatus 17 displays the popularity of a tag corresponding to a knowledge point based on the condition of each knowledge point being accessed by the user, including IP distribution information about each tag being accessed.

As shown in FIG. 9A, the knowledge point popularity display apparatus 17 displays classification popularity of a certain tag, e.g., the number of people having viewed the knowledge point corresponding to the tag, the number of people having authenticated the knowledge point corresponding to the tag, and the number of people having mastered the knowledge point corresponding to the tag. Dynamic condition of a tag being accessed is shown in FIG. 9A.

As shown in FIG. 9B, the knowledge point popularity display apparatus 17 displays the statistic analysis of users having viewed the knowledge point corresponding to a certain tag, and statistics about the number of users having viewed the knowledge point corresponding to the tag with different age groups is illustrated in FIG. 9B.

As shown in FIG. 9C, the knowledge point hotness popularity apparatus 17 displays the statistics about the users' sharing condition of the tag, for example, the number of people who have hidden a user identity, the number of people who have opened the user identity, the number of users participated in sharing and the number of users having a tutoring ability. FIG. 9C shows a user's attitude to sharing a knowledge point.

Although the above-mentioned methods are illustrated and described as a series of actions for simplifying explanation, it should be understood and appreciated that the methods are not limited to the order of the actions, because according to one or more embodiments, some actions can occur in a difference order and/or occur concurrently with other actions illustrated and described herein, or not illustrated and described herein but can be understood by a person skilled in the art.

It will be further appreciated by a person skilled in the art that various illustrative logic blocks, modules, circuits, and algorithm steps described in conjunction with the embodiments disclosed herein can be implemented as electronic hardware, computer software, or a combination thereof. In order to clearly illustrate the interchangeability between hardware and software, various illustrative components, frames, modules, circuits, and steps are generalizedly described above in the form of functionalities thereof. Whether such functionalities are implemented as hardware or software is dependent on a particular application and design constrains imposed on the entire system. A person skilled could implement the described functionalities in different manners for each specific application, but this implementation decision should not be construed as resulting in departing from the scope of the present invention.

The various illustrative logic blocks, modules, and circuits described in conjunction with the embodiments disclosed herein can be implemented and executed with a general-purpose processor, a digital signal processor (DSP), an application-specific integrated circuit (ASIC), a field programmable gate array (FPGA) or other programmable logic devices, discrete gates or transistor logics, discrete hardware components, or any combination thereof designed to execute the functions described herein. The general-purpose processor can be a micro-processor, but in an alternative, the processor can be any conventional processor, controller, micro-controller, or state machine. The processor can also be implemented as a combination of computer devices, e.g. a combination of a DSP and a micro-processor, a plurality of micro-processors, one or more micro-processors cooperating with a DSP core, or any other such configurations.

The steps of the method or algorithm described in conjunction with the embodiments disclosed herein can be embodied in hardware, software module executed by the processor, or a combination thereof. The software module can reside in an RAM memory, a flash memory, an ROM memory, an EPROM memory, an EEPROM memory, a register, a hard disk, a removable disk, a CD-ROM, or any other type of storage medium known in the art. An exemplary storage medium is coupled to the processor, so that the processor may read and write information from/to the storage medium. In an alternative, the storage medium can be integrated into the processor. The processor and the storage medium can reside in an ASIC. The ASIC can reside in a user terminal. In an alternative, the processor and the storage medium can reside in the user terminal as discrete components.

In one or more exemplary embodiments, the described functions can be implemented in hardware, software, firmware or any combination thereof. If they are implemented as a computer program product in software, then various functions can be stored in a computer readable medium as one or more instructions or codes or transported via same. The computer readable medium comprises both a computer storage medium and a communication medium, and comprises any medium facilitating a computer program transferring from one place to another. The storage medium can be any available medium that can be accessed by a computer. As an example but not limitation, such a computer readable medium can comprise RAM, ROM, EEPROM, CD-ROM or other optical disk storages, magnetic disk storages or other magnetic storage apparatus, or any other medium that can be used for carrying or storing appropriate program codes in the form of instructions or data structures and can be accessed by a computer. Any connection is also rightly called a computer readable medium. For example, if the software is transported from a web site, a server, or other remote sources using a coaxial-cable, an optical fiber cable, a twisted pair, a digital subscriber line (DSL), or wireless techniques such as infrared, radio, and microwave or the like that, then the coaxial-cable, the optical fiber cable, the twisted pair, the DSL, or the wireless techniques such as infrared, radio, microwave or the like that are included in the definition of medium. Disks and discs as used herein comprise a compact disc (CD), a laser disc, an optical disc, a digital versatile disc (DVD), a floppy disk and a blue-ray disc, wherein disks often reproduce data magnetically, and discs optically reproduce data with laser. Combinations of the forgoing should also be included in the range of computer readable medium.

The previous description of the present disclosure is provided to enable any one skilled in the art to make or use the present disclosure. Various modifications to the present disclosure would all be obvious to a person skilled in the art, and the general principles defined herein can be applied to other variations without departing from the spirit or scope of the present disclosure. Thereby, the present disclosure is not intended to be limited to the examples and designs described herein, but should be granted with the widest scope consistent with the principle and novelty features disclosed herein.

What is claimed is:

1. A knowledge-learning system in a digital environment, comprising:
    a terminal device for recording knowledge learning information from interactive learning operations by a user, wherein the terminal device comprises an application specific integrated circuit; and
    a cloud server coupled with the terminal device via a communication medium, wherein the cloud server comprises one or more processors and a non-volatile memory having instructions stored thereon, wherein when executing the instructions, the one or more processors are enabled to receive the knowledge learning information from the terminal device via the communication medium,
    the non-volatile memory of the cloud server comprises:
        a first area for storing a knowledge structure based on a set of knowledge points, a set of tags, a set of relationships among the set of knowledge points and the set of tags, and
        a second area for storing user information associated with the user,
    wherein time-based learning tracks based on the knowledge learning information received from the terminal device and the structurized knowledge are stored as the user information in the second area of the non-volatile memory,
    wherein the first area of the non-volatile memory comprises:
        a first sub-area for storing the set of knowledge points;
        a second sub-area for storing the set of tags having one-to-one correspondences with the set of knowledge points; and
        a third sub-area for storing the set of relationships among the set of knowledge points and the set of tags; and
    wherein the knowledge structure is constructed based on the set of relationships and the set of knowledge points is stored with the knowledge structure.

2. The knowledge-learning system as recited in claim 1, wherein the communication medium is a connection allowing data structures to be transported from a web site, a server, or a remote source using a coaxial-cable, an optical fiber cable, a twisted pair, a digital subscriber line (DSL), or wireless techniques such as infrared, radio, and microwave.

3. The knowledge-learning system as recited in claim 1, wherein the terminal device performs a knowledge point access operation to access for text, picture, audio, video, multi-media, or multi-language information.

4. The knowledge-learning system as recited in claim 1, wherein the knowledge learning information further comprises
    a subset of knowledge points selected from the set of knowledge points during the interactive learning operations by the user,
    a subset of relationships related to the subset of knowledge points,
    a classification about the interactive learning operations by the user, and
    social attribute information related to sharing of the subset of knowledge points by the user.

5. The knowledge-learning system as recited in claim 4, wherein the user information includes
    the subset of knowledge points corresponding to the user,
    the subset of relationships corresponding to the user,
    a user knowledge structure constructed based on the subset of knowledge points and the subset of relationships, and
    the social attribute information related to the user.

6. The knowledge-learning system as recited in claim 4, wherein the user information is classified as viewed, authenticated, or mastered.

7. The knowledge-learning system as recited in claim 4, wherein the social attribute information includes whether the user shares the subset of knowledge points.

8. The knowledge-learning system as recited in claim 1, wherein the time-based learning tracks are recorded during a learning of the subset of knowledge points by the user.

9. The knowledge-learning system as recited in claim 1, wherein the time-based learning tracks are recorded during a learning of a single class of knowledge points by the user.

10. The knowledge-learning system as recited in claim 1, wherein when executing the instructions, the one or more processors of the cloud server is further enabled for displaying popularity of the set of knowledge points.

* * * * *